United States Patent [19]

Nakashima et al.

[11] 4,353,934
[45] Oct. 12, 1982

[54] DIP-COATING METHOD

[75] Inventors: Atushi Nakashima; Michisuke Edamatu; Kenji Kushi, all of Ohtake, Japan

[73] Assignee: Mitsubishi Rayon Company, Ltd., Tokyo, Japan

[21] Appl. No.: 163,360

[22] Filed: Jun. 26, 1980

[30] Foreign Application Priority Data

Jul. 9, 1979 [JP] Japan .................. 54/86722
Jul. 10, 1979 [JP] Japan ................. 54/87232

[51] Int. Cl.³ .............................. B05D 3/12
[52] U.S. Cl. .................... 427/57; 427/169; 427/443.2
[58] Field of Search ............. 118/429, 402, 403; 228/37; 427/57, 443.2, 169

[56] References Cited

U.S. PATENT DOCUMENTS

| | | | |
|---|---|---|---|
| 2,554,803 | 5/1951 | Wysocki | 118/429 X |
| 3,291,640 | 12/1966 | Livingston | 134/1 |
| 3,538,886 | 11/1970 | Patterson | 118/73 |
| 4,036,168 | 7/1977 | Laliberte et al. | 118/8 |
| 4,046,105 | 9/1977 | Gomez | 118/429 |
| 4,199,421 | 4/1980 | Kamada et al. | 204/159.22 |

FOREIGN PATENT DOCUMENTS

| | | |
|---|---|---|
| 1067657 | 10/1959 | Fed. Rep. of Germany . |
| 1577685 | 1/1970 | Fed. Rep. of Germany . |
| 2718758 | 2/1978 | Fed. Rep. of Germany . |
| 1055634 | 2/1954 | France . |
| 2357312 | 2/1978 | France . |
| 275396 | 5/1951 | Switzerland . |

*Primary Examiner*—Bernard D. Pianalto
*Attorney, Agent, or Firm*—Sprung, Horn, Kramer & Woods

[57] ABSTRACT

A dip-coating method for forming a smooth coated film on the surface of an article by dipping the article in a coating solution while making ultrasonic waves act on the coating solution and forming a uniform liquid flow on the surface of the coating solution. An apparatus for practicing the method is also disclosed.

4 Claims, 11 Drawing Figures

DIP-COATING METHOD

BACKGROUND OF THE INVENTION

1. Field of the Invention

This invention relates to a dip-coating method and apparatus for forming a flat smooth coated film surface on the surface of an article.

More particularly the present invention is to provide a method and apparatus for obtaining a very fine coated film having no irregularity on an article to be coated by making ultrasonic waves act on a coating solution and forming a uniform surface liquid flow in a coating solution tank. In case the present invention is applied to coat the surface of such optical product as a mirror or lens, a remarkable effect that a product quality of such excellent level as has never been realized before will be obtained.

2. Description of Prior Arts

A method of forming a coated film on the surface of an article to be coated by dipping the article in a coating solution and then pulling the article up out of the coating solution at a low speed has been already utilized as a dip-coating method. This method has demerits that the article to be coated is limited to be of a simple shape having no solution pool but has merits that the obtained coating film is high in the smoothness and that the entire surface of the article to be coated can be coated at once, and thus is used for such surface coating as the under coating or upper coating of a metal or synthetic resin article.

In case the coated article is to be used for such optical product as a mirror, lens or glazing or in case it is to be printed or plated as a secondary work, a higher smoothness of the coating film having no irregularity will be required.

These irregularity defects are called "pinholes", "blemishes", "splashes" and "craters" in the industry. Their elimination is made an important problem of securing the quality.

These defects of the coated film can be comparatively reduced by such methods wherein the article to be coated is washed and cleaned with a detergent or the like in advance, such impurities as dust in the coating solution are filtered off to be removed and further the entire atmosphere in which the article is dip-coated and the coated film is dried to be hardened is cleaned. But the smoothness of the coated film has been insufficient.

Further, there is an attempt to secure the smoothness of the coated film by flowing the coating solution in the coating tank so quietly as to spout. However, it has not been satisfactory.

SUMMARY OF THE INVENTION

As a result of studies, it has been discovered that, when ultrasonic waves are made to act on a coating solution in the case of dip-coating so that cavitation bubbles generated by the ultrasonic waves may remove gas dissolved in the coating solution or adhered to the surface of the article from the solution or the article and a strong uniform liquid flow is formed on the surface of a coating solution, the above mentioned defects of the coated film will be substantially eliminated.

The radiation of ultrasonic waves is considered to be required to drive out air present as dissolved in the coating solution and to destroy the air layer brought in as deposited on the surface of the article to be coated when the article is dipped in the coating solution. When the bubbles generated by the cavitation stay for a long time on the coating solution surface or around the coated article at the coating solution surface, such defects as "blemishes" and "pinholes" will be generated or traces of the bubbles will be left when the article is pulled up. Therefore, the strong surface liquid flow is considered to be required to prevent it.

BRIEF DESCRIPTION OF THE DRAWING

The present invention shall be described in the following with reference to the drawings in which.

DETAILED DESCRIPTION OF THE DRAWING

Figure 1:
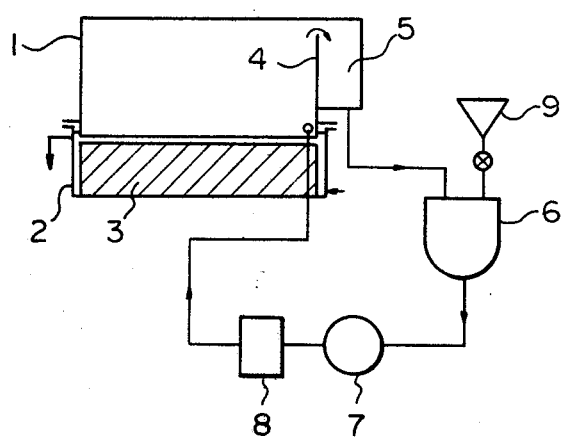
FIG. 1 is a flow sheet showing an embodiment of the present invention.

In FIG. 1, a coating solution in a coating solution tank 1 overflows a dam 4 and comes to an intermediate tank 6 through an overflow pocket 5. A funnel 9 for pouring in a solution to be added is attached to the intermediate tank 6. When the solution from the intermediate tank 6 is pressurized by a circulating pump 7 and passes through a filter 8, impurities in the solution will be removed. The solution coming out of the filter is returned to the coating solution tank 1 to circulate.

In the drawing, reference numeral 2 indicates a water tank for containing an ultrasonic oscillator. When the coating solution tank 1 is dipped in the water tank 2 and is placed near the ultrasonic wave oscillator 3, ultrasonic waves generated from the ultrasonic oscillator 3 will produce ultrasonic wave pressure waves in the coating solution through the wall of the coating solution tank 1 through water in the water tank 2.

It is preferable to take in fresh water from outside in the water tank so as to play a part as of a medium to propagate ultrasonic waves and a part of removing heat generated from the ultrasonic wave oscillator.

Figure 2:
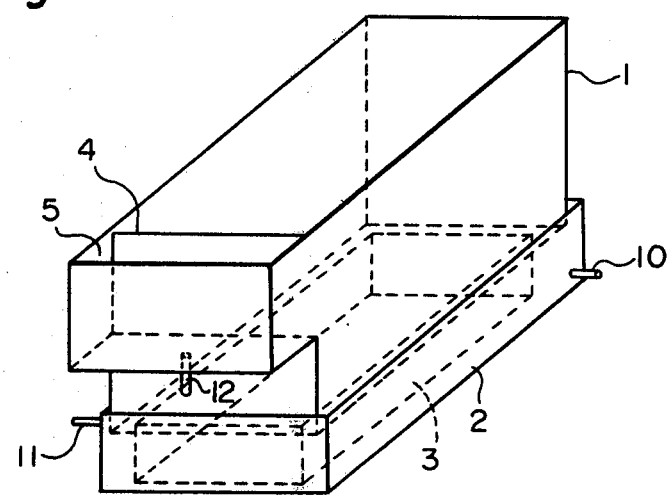
FIG. 2 is a perspective view in which an ultrasonic wave oscillator is set on the bottom outside a coating solution tank.

In FIG. 2, nozzles 10 and 11 are respectively a water feeding nozzle and water discharging nozzle.

In each of FIGS. 1 and 2, the ultrasonic wave oscillator 3 is outside the coating solution tank 1 and the oscillating surface of the ultrasonic wave oscillator 3 is arranged as opposed to the bottom surface of the coating solution tank 1 but, when the coating solution is inert to the ultrasonic wave oscillator and is not likely to corrode it, the oscillating surface may be directed upward and arranged directly within the coating solution tank.

Further, the coating solution temperature shows a tendency to rise with the ultrasonic wave oscillation of the coating solution. However, when it is not desirable to the coating solution, a cooler for the coating solution may be provided in the circulating line.

Figure 3:
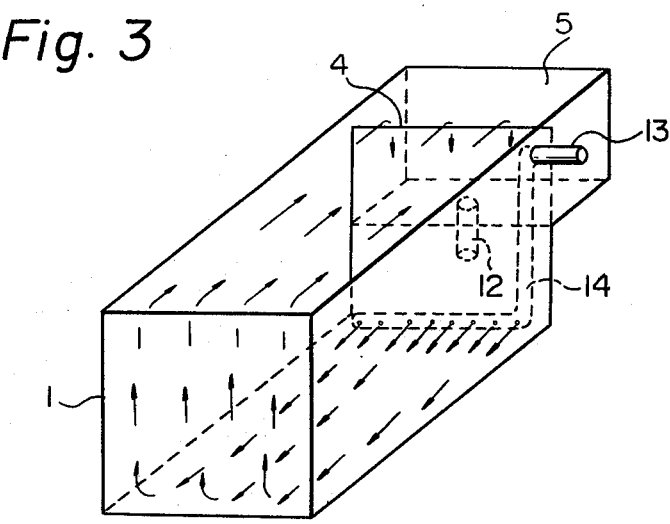
FIGS. 3 and 4 are perspective views each showing a coating solution tank and coating solution flow pattern.

In the present invention, when many articles to be coated are to be dipped over the width direction of the tank, a method of radiating ultrasonic waves from the tank bottom as in FIG. 2 will be effective but, when there are only one article to be coated over the width direction of the tank, the article will not be shaded by other articles and thus ultrasonic waves may be radiated from the side of the tank. In the present specification, "the width direction of the tank" means a direction at right angles with the direction in which the solution flows toward the overflow pocket and "the lengthwise direction of the tank" means a direction parallel with it, as shown in FIG. 3.

The frequency of the ultrasonic waves radiated to the coating solution is 1 to 100 KHz or preferably 5 to 50 KHz. If the frequency is less than 1 KHz, a cavitation will be hard to occur. If the frequency exceeds 100 KHz, generation and extinction of cavitation bubbles in the solution will take time and therefore the ultrasonic waves will not act to the solution effectively.

The strength of the ultrasonic waves is 0.2 to 5 w./cm$^2$. In case the strength of the ultrasonic waves is less than 0.2 w./cm.$^2$, the cavitation pressure waves will be weak. When the strength is in excess of 2 w./cm.$^2$, the propagation of the ultrasonic waves will be obstructed by the cavitation bubbles generated. Further, the strength of the ultrasonic waves for the solution capacity is in a preferable range of about 10 to 100 w./l.

It is necessary that the feed of the coating solution to the coating solution tank on which ultrasonic waves are made to act should form a uniform surface liquid flow toward the overflow pocket on the surface of the coating solution tank in order to make the cavitation bubbles produced by the ultrasonic waves smoothly flow away in turn from the coating solution tank surface while making the cavitation bubbles act on the articles to be coated. When the cavitation bubbles are not made to smoothly flow away, they will cover the entire coating solution tank surface, further air present as dissolved in the coating solution or the destroyed air layer on the surface of the article to be coated will stay in the bubbles to leave on the coated film such defects as "blemishes", "splashes" and "pinholes" or traces of bubbles.

It has been discovered that the above mentioned uniform surface liquid flow is formed by jetting the coating solution uniformly and parallelly with the bottom surface of the coating solution tank, from the side on which the coating solution overflows toward the side opposite it at the bottom of the tank.

Figure 4:
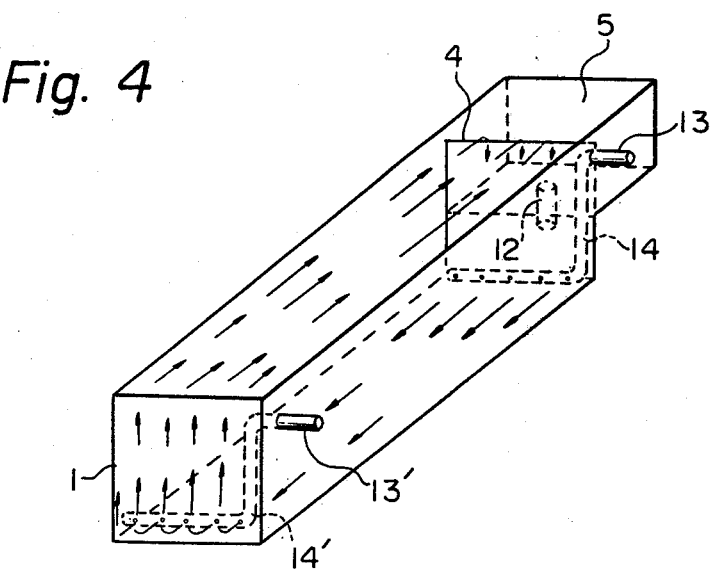

Each of FIGS. 3 and 4 is an explanatory view of a method and apparatus for forming a uniform liquid surface flow. FIG. 3 is of a case that the length of the direction in which the coating solution flows on the rectangular solution surface of the coating solution tank is not larger than 3 times the depth of the coating solution tank and FIG. 4 is of a case that the length exceeds 3 times.

In FIG. 3, a solution inflow port 13 to feed the coating solution is connected to a jetting nozzle 14 having many orifices and located on the overflow pocket 5 side of the bottom surface of the coating solution tank.

As illustrated, the solution jetted out of the jetting nozzle 14 is deaerated by the ultrasonic waves radiated from the bottom of the coating solution tank, rises against the tank wall opposed to the jetting nozzle 14, becomes a turned surface flow on the solution surface, overflows the dam 4 and reaches the overflow pocket 5.

The coating solution increases again in the amount of air present as dissolved by contacting air while flowing on the coating solution tank solution surface and down into the overflow pocket. However, the amount of air is reduced by subjecting the coating solution to the radiation of ultrasonic waves in the tank bottom after the solution was circulated through overflow pocket 5 and again jetted out of the jetting nozzle 14.

The flow formed on the coating solution tank surface has not only an action of making the cavitation bubbles flow away but also an effect of quickly flowing into the overflow pocket 5 the dust and dirt floating on the coating solution surface, which dust and dirt are ones dropped from air over the tank on the coating solution or brought in the solution together with the articles depositing their surfaces.

Further, in the coating solution tank 1, such a strong circulating flow is made by this jetting nozzle 14 that there is no dead space anywhere.

Figure 5:
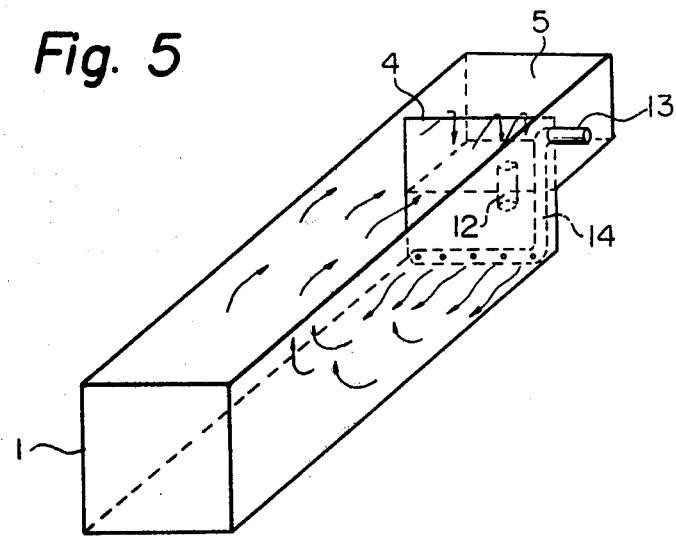
FIGS. 5, 6, 7 and 8 are perspective views each showing another coating solution tank and coating solution flow pattern.

If the length in the flowing direction of the tank is large, as shown in FIG. 5, the solution flow jetted out of the jetting nozzle 14 will not reach the opposed tank wall, will become a turned flow on the way and will flow into the overflow pocket 5. Particularly, if the entire article to be coated enters the coating solution tank, the fluid resistance will become maximum, the flow will be remarkably inhibited, the jetted solution flow will become such short-circuiting flow as will soon flow into the overflow pocket 5 and no uniform surface flow will be obtained.

In such flowing state, the part on the side opposite the overflow pocket 5 of the coating solution tank will become a dead space and, on the solution surface, not only the cavitation bubbles will stay but also the dust and dirt floating on the solution surface will not smoothly flow into the overflow pocket and "blemishes" and "pinholes" will be generated on the coated film surface.

In order to make the solution flow reach the opposed tank wall, an excess volume of jetting flow will be required. As a result, the solution surface of the coating solution tank will be disturbed, flow patterns induced thereby will be made on the surface of the coated article.

It has been confirmed that, with a normally used plastic surface treating solution, a uniform surface flow will be obtained by the method in FIG. 3 when the length in the flowing direction of the coating solution tank is not larger than 3 times the depth of the coating solution tank.

FIG. 4 is of a method of forming a uniform strong surface flow in a tank long in the flowing direction. Therein, a second solution inflow port 13' and a second solution jetting nozzle 14' connected to it are provided on the side opposite the over flow pocket side of the tank bottom. The solution jetted out of the second jetting nozzle 14' turns against the tank wall surface to become a surface flow.

By the solution flow from this second jetting nozzle 14', the dead space in the part on the side opposite the overflow pocket 5 of the coating solution tank 1 will be eliminated and the solution flow jetted out of the first jetting nozzle 14 will be sucked and accompanied to form a uniform surface flow.

The ratio of flow volumes jetted out of the first jetting nozzle 14 and second jetting nozzle 14' is different depending on the length of the coating solution tank 1 and the viscosity of the coating solution but is approximately in a range of the flow volume out of the first jetting nozzle/flow volume out of the second jetting nozzle = 5/1 to 1/1.

Figure 9:
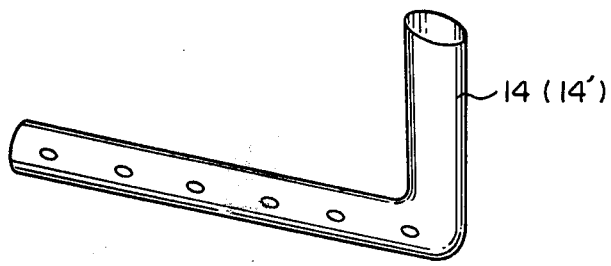
FIGS. 9 and 10 are perspective views respectively of a jetting nozzle having many orifices and a jetting nozzle having a slit.
Figure 10:
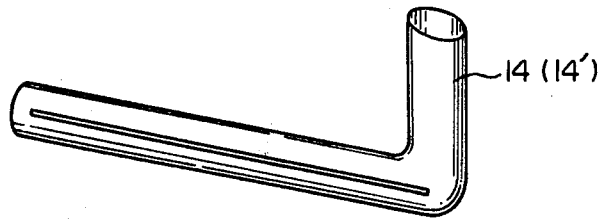

Each of the above mentioned first jetting nozzle 14 and second jetting nozzle 14' may have not only many orifices as in FIG. 9 but also a slit as in FIG. 10. In order to obtain a uniform surface flow, it is essential to have a uniform jetted volume over each jetting part of the jetting nozzle.

Figure 11:
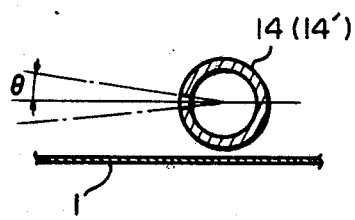
FIG. 11 is a sectioned view showing the posture of fitting the jetting nozzle to the bottom surface of the coating tank.

The coating solution should be jetted parallelly with the tank bottom surface. For that purpose, as shown in FIG. 11, the holes of the first jetting nozzle 14 and second jetting nozzle 14' must be provided in such a range of an angle θ to the bottom surface of the coating tank 1 that θ = 10 to −10 degrees, or preferably 5 to −5 degrees (the negative sign indicates to be directed downward from the parallel position).

The flow velocity of the coating solution on the surface of the coating solution tank may be such as can attain the object of the present invention and is 2 to 100 cm/sec or preferably 10 to 50 cm/sec. In case the flow velocity of the coating solution is less than 2 cm/sec, it will not be preferable because "blemishes" and "splashes" will occur. In case the flow velocity exceeds 100 cm/sec, it will not be preferable because "flow patterns" will occur.

Figure 6:
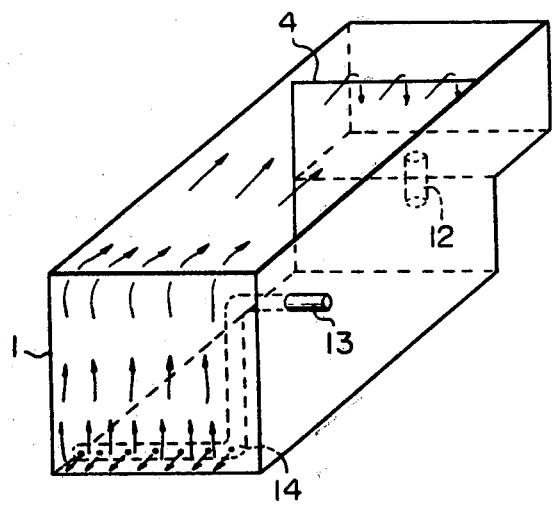

For obtaining a uniform surface flow, there are not only coating solution tanks having such structures as in FIGS. 3 and 4 but also a coating solution tank wherein the inflow solution is merely jetted directly against the tank wall on the side opposite the overflow pocket as in FIG. 6, but in the latter case, there are defects that the inflow solution will have few chances of being subjected to the ultrasonic wave radiation from the tank bottom and that a dead space will be likely to be made on the overflow pocket side of the tank bottom.

Figure 7:
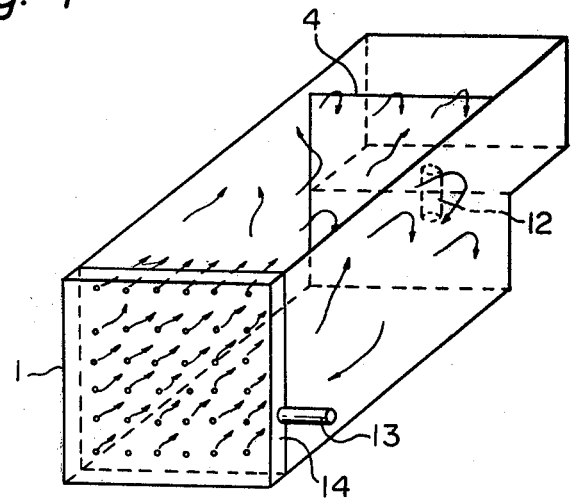

Further, in such case as in FIG. 7, the jetted solution flow will produce a counter flow against the tank wall on the overflow pocket side and therefore no substantial surface flow will be obtained.

Figure 8:
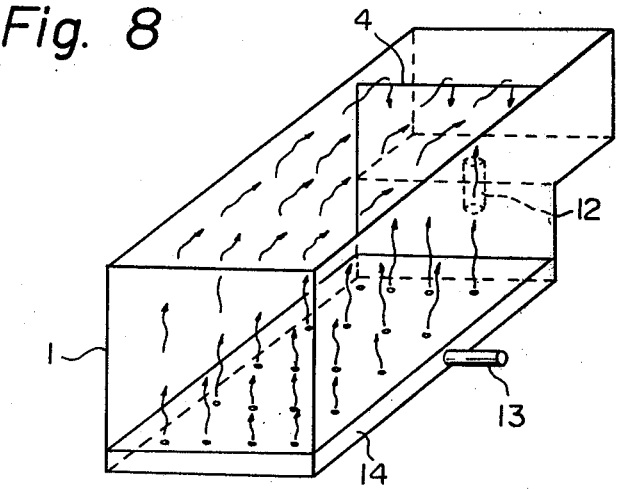

In such method of uniformly jetting the coating solution out of the tank bottom as in FIG. 8, a very quiet surface flow will be obtained but there will be a basic problem that a partition wall forming solution jetting ports in the tank bottom will obstruct the ultrasonic wave action so that the ultrasonic waves may not reach the article to be coated.

As evident with the above explanation, the present invention relates to a method and apparatus for radiating ultrasonic waves to a coating solution, and feeding the coating solution uniformly and parallelly with the tank bottom from the side on which the coating solution overflows toward the side opposite it at the bottom of the coating solution tank whereby a uniform surface flow toward the overflow pocket will be formed over the tank width direction on the surface of the coating solution tank, the bubbles generated by the cavitation of the ultrasonic waves will not stay on the solution surface and such effect by the ultrasonic waves as is mentioned above will effectively be achieved.

Therefore, according to the present invention, a coated film very high in the surface smoothness will be obtained.

The utility of the present invention is made clear by the following examples in which parts are by weight and the measurements and evaluations were made by the following methods:

(1) Measurement of Surface Smoothness
 (a) Sight
  o: The surface of the film is good in the smoothness.
  x: The surface is disturbed and is low in the smoothness.
 (b) Focal power
  Measured by using a lens meter (JIS B 7183-1975). The smaller the numerical value (absolute value), the higher the smoothness of the surface.
 (c) Cylindrical power
  Measured by using a lens meter (JIS B 7183-1975). The smaller the numerical value (absolute value), the higher the smoothness of the surface.
 (d) Definition
  By using a telescope of a magnification of 10 times, an NBS Resolution Test Chart is resolved from a distance of 5 meters, through a sample placed in front of the telescope and the definition is represented by the numerical value of the Resolution Test Chart. The larger the numerical value, the higher the definition of the sample.
(2) Judgment of Surface Defects (blemishes)
 o: The blemishes are not conspicuous.
 x: The blemishes are conspicuous.

EXAMPLE 1 AND CONTROLS 1 TO 5

A solution consisting of 30 parts of trimethylolethane trimethacrylate, 10 parts of 1,6-hexanediol diacrylate, 30 parts of n-propyl alcohol, 30 parts of toluene and 2 parts of benzoin ethylether was put into each of a dip-coating apparatus (Example 1) formed of the process in FIG. 1 and the coating solution tank in FIG. 3, a dip-coating apparatus (Control 1) formed of the process in FIG. 1 and the coating solution tank in FIG. 6, a dip-coating apparatus (Control 2) formed of the process in FIG. 1 and the coating solution tank in FIG. 7 and a dip-coating apparatus (Control 3) formed of the process in FIG. 1 and the coating solution tank in FIG. 8 and each apparatus was operated while actuating the ultrasonic wave oscillating device. Such nozzle as is shown in FIG. 9 was used for the jetting nozzles 14, of Example 1 and Control 1.

In each apparatus, the size of the tank was of 700 mm long × 250 mm wide × 400 mm deep and the flow velocity on the surface of the coating solution was made 20 cm/sec. The ultrasonic wave oscillating device was of a frequency of 28 KHz and a strength of 1.0 w/cm$^2$.

An uniform methacrylic resin plate of 600 mm long × 380 mm wide × 3 mm thick was dipped in each of these dip-coating apparatus in such a way that the surfaces of the sheet was placed parallelly with the longer side wall of the tank, was pulled up into clean air at a velocity of 0.5 cm/sec and was immediately irradiated for 5 seconds with ultraviolet rays from a high voltage mercury lamp of 2 KW in a clean nitrogen gas current. The appearance of each obtained coated plate was as in Table 1.

Controls 4 and 5 are respectively of a case that only the ultrasonic wave oscillating device was stopped while the circulation of the solution was left at it was in Example 1 and a case that only the circulation of the solution was stopped while the ultrasonic wave oscillating device was left as it was. The obtained evaluation results are shown in Table 1.

TABLE 1

|  | Surface Smoothness | | | | Surface Defects |
|---|---|---|---|---|---|
|  | (a) | (b) | (c) | (d) |  |
| Example 1 | o | 0.11 | 0.10 | 48 | o |
| Control 1 | x | 0.30 | 0.29 | 12 | x |
| Control 2 | x | 0.29 | 0.31 | Impossible | x |

TABLE 1-continued

|  | Surface Smoothness | | | | Surface Defects |
| --- | --- | --- | --- | --- | --- |
|  | (a) | (b) | (c) | (d) |  |
| Control 3 | x | 0.31 | 0.35 | 14 | x |
| Control 4 | x | 0.41 | 0.35 | Impossible | x |
| Control 5 | x | 0.37 | 0.34 | 12 | x |

EXAMPLE 2 AND CONTROLS 6 TO 8

The treating solution used in Example 1 was put into each of a dip-coating apparatus (Example 2) formed of the process in FIG. 1 and the coating solution tank in FIG. 4 and a dip-coating apparatus (Control 6) formed of the process in FIG. 1 and the coating solution tank in FIG. 5 and each apparatus was operated while actuating the ultrasonic wave oscillating device. Such nozzle as is shown in FIG. 9 was used for the jetting nozzles 14, 14' of Example 2 and Control 6.

In each apparatus, the size of the tank was of 700 mm long×250 mm wide×150 mm deep and the flow velocity on the surface of the coating solution was made 30 cm/sec. The ultrasonic wave oscillating device was of a frequency of 28 KHz and a strength of 0.7 w/cm$^2$.

A uniform methacrylic resin plate of 630 mm long×230 mm wide×3 mm thick was dipped in each of these tanks in the same way as in Example 1, was pulled up into clean air at a velocity of 0.5 cm/sec and was immediately irradiated for 5 seconds with ultraviolet rays from a high voltage mercury lamp of 2 KW in a clean nitrogen gas current. The appearance of each obtained coated plate was as in Table 2.

Control 7 is of a case that only the nozzles 14 and 14' were stopped while the ultrasonic wave oscillating device was left as it was in Example 2 and Control 8 is of a case that only the ultrasonic wave oscillating device was stopped in Example 2. The obtained results are shown in Table 2.

TABLE 2

|  | Surface Smoothness | | | | Surface Defects |
| --- | --- | --- | --- | --- | --- |
|  | (a) | (b) | (c) | (d) |  |
| Example 2 | o | 0.09 | 0.10 | 56 | o |
| Control 6 | o~x | 0.20 | 0.19 | 34 | o~x |
| Control 7 | x | 0.35 | 0.36 | 14 | x |
| Control 8 | x | 0.33 | 0.35 | 12 | x |

EXAMPLE 3

Example 1 was repeated except that the ultrasonic waves were irradiated through both the longer side walls of the tank, a dip-coating tank of 700 mm long×400 mm wide×400 mm deep was used, and a methacrylic resin plate of 600 mm long×380 mm wide×10 mm thick was dipped.

Surface smoothness and surface defects of the obtained coated plate were almost the same as in Example 1.

We claim:

1. In the dip-coating method for obtaining a coated film on the surface of an article by circulating a coating solution in a tank, dipping the article in the solution and then pulling the article up out of the coating solution, the improvement which comprises irradiating the coating solution with ultrasonic waves, and jetting the coating solution uniformly and parallel to the bottom of the coating solution tank through a jet nozzle at the tank bottom and from the side of the tank on which the coating solution overflows toward the side opposite it at the bottom of the tank, the ultrasonic waves ranging in frequency from 1 to 100 KHz and in strength from 0.2 to 2 w/cm$^2$, and the flow velocity of the coating solution within the coating solution tank ranging from 2 to 100 cm/sec.

2. A dip-coating method according to claim 1 wherein, the length of the coating solution tank in the direction in which the coating solution flows on the rectangular solution surface of the coating solution tank is not larger than 3 times the depth of the coating solution tank, the coating solution is jetted at the tank bottom and only from the side on which the coating solution overflows, and the ultrasonic waves are irradiated from the bottom of the tank.

3. A dip-coating method according to claim 1, wherein, the length of the coating solution tank in the direction in which the coating solution flows on the rectangular solution surface of the coating solution tank exceeds 3 times the depth of the coating solution tank, the coating solution is jetted at the tank bottom from both the side on which the coating solution overflows and the side opposite it and the ultrasonic waves are irradiated from the bottom of the tank.

4. A dip-coating method according to claim 1, wherein, one article is dipped in the coating solution, and the ultrasonic waves are irradiated from the side wall of the coating solution tank.

* * * * *

UNITED STATES PATENT AND TRADEMARK OFFICE
CERTIFICATE OF CORRECTION

PATENT NO. : 4,353,934
DATED : October 12, 1982
INVENTOR(S) : Atushi Nakashima et al It is certified that error appears in the above—identified patent and that said Letters Patent is hereby corrected as shown below:

On the title page-

Under "Foreign Patent Documents" after "27 18 758"   Delete "2/78" and insert --11/78--

Signed and Sealed this

Twenty-second Day of February 1983

[SEAL]

Attest:

GERALD J. MOSSINGHOFF

Attesting Officer   Commissioner of Patents and Trademarks